Dec. 10, 1957    B. W. OSWALT    2,815,830
HYDRAULIC BRAKE ADJUSTER
Filed Aug. 1, 1951
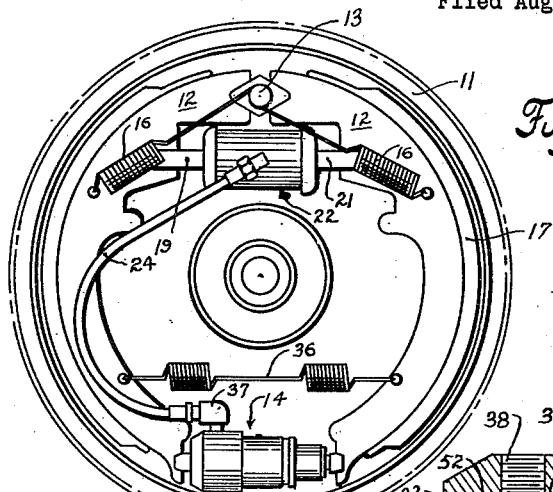
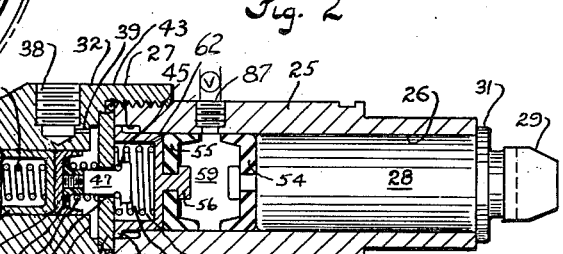
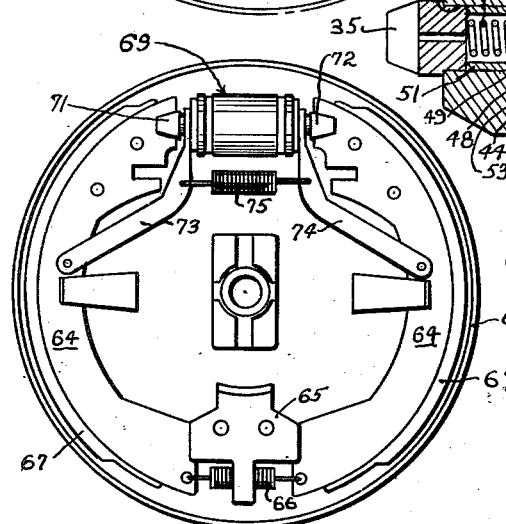
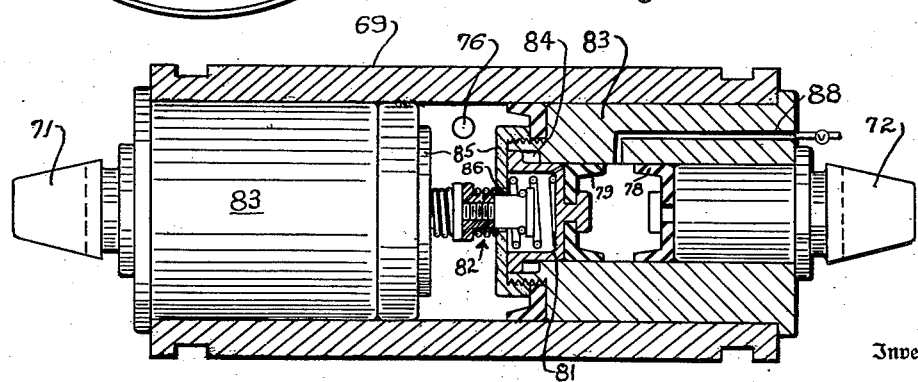
Inventor
BURLIN W. OSWALT
By Tom Walker
Attorney United States Patent Office 2,815,830
Patented Dec. 10, 1957

2,815,830

HYDRAULIC BRAKE ADJUSTER

Burlin W. Oswalt, Union, Ohio

Application August 1, 1951, Serial No. 239,746

3 Claims. (Cl. 188—152)

This invention relates to hydraulic systems, and particularly to hydraulic actuating cylinders wherein it is desired to automatically adjust the starting position of an extensible piston therein to compensate for variations in the required travel of the piston. The invention is particularly applicable, although not limited, to hydraulic brake devices. It functions therein to make automatic compensation for wear of the brake and for relatively unequal rates of heat induced expansion as between the brake shoes and brake drum as to avoid softness in the brake and binding or dragging thereof.

The object of the invention is to improve the construction as well as the means and mode of operation of hydraulic brake actuators, whereby they may not only be economically manufactured, but will be more efficient and satisfactory in use, automatic in adjustment, uniform in action, possess relatively few operating parts, and be unlikely to get out of repair.

Another object of the invention accordingly is to compensate for unequal heat induced expansion as described while precluding binding of the brake upon cooling.

Another object of the invention is to distinguish between increases in brake clearance resulting from wear and those resulting from expansion by avoiding a fixed compensation in the case of increases in clearance resulting from heat expansion.

A further object of the invention is to provide for a locking of the brakes in outwardly adjusted position, such locking being automatically initiated and released in response respectively to the application and discontinuing of fluid pressure in the system.

Still another object of the invention is to present hydraulic cylinders as described readily applicable to known types of hydraulic brakes.

A further object of the invention is to provide hydraulic brake actuators possessing the advantageous structural features, inherent meritorious characteristics and mode of operation herein described, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawing, wherein is illustrated the preferred but obviously not necessarily the only form of embodiment thereof, Fig. 1 is a sectional plan view of a wheel brake assembly of one known type, showing a hydraulic adjustment cylinder in accordance with the instant invention;

Fig. 2 is a sectional view through the adjustment cylinder of Fig. 1;

Fig. 3 is a view similar to Fig. 1, showing the invention as applied to another type of brake; and Fig. 4 is a sectional view through the cylinder of Fig. 3.

Like parts are indicated by similar characters of reference throughout the several views.

The invention is disclosed in connection with hydraulic braking apparatus for automobiles and like devices. It is shown as embodied in two of the more commonly known and used hydraulic brake systems.

Referring first to that shown in Figs. 1 and 2 (commonly known as a "Bendix" brake) a cylindrical brake drum 11 carried by a wheel is mounted in surrounding relation to a pair of segmental brake shoes 12. The upper ends of the shoes 12 are loosely pivoted upon a fixed stud 13 while the lower ends are connected to the opposite ends of a hydraulic adjusting cylinder 14. A series of interconnecting springs 16 urge the shoes 12 to a retracted position relatively to the drum 11. In such position, flanges 17 on the shoes 12, overlaid with a facing material, are spaced from the drum.

Adjacent their upper ends the shoes 12 are engaged by pistons 19 and 21 reciprocable within a cylinder 22 supplied with hydraulic fluid. A flexible conduit 24 connects the brake actuating cylinder 22 to the adjusting cylinder 14 so that the bottom ends of the shoes 12 may be adjusted outward into engagement with the drum 11 at about the same time as or just prior to extension of the pistons 19 and 21 from cylinder 22 to press the shoes against the drum with braking force.

The cylinder 22 may be constructed as any conventional wheel brake cylinder. The cylinder 14, in accordance with the instant illustrated embodiment of the invention, comprises an open ended tubular body 25 having a bore 26, and, in one end thereof, a counterbore 27. At the end opposite counterbore 27 the cylinder body 25 receives a piston 28 having a projecting head 29 and an annular collar 31 lying outside the bore 26. The head 29 is slotted to engage the bottom end of one of the shoes 12. The collar 31 is engageable with the outer end of the cylinder body to limit inward motion of the piston 28.

At its counterbored end the cylinder body 25 is externally threaded to mount a closure cap 32, the cap 32 having a through bore 33, aligned with the body bore 26, and a counterbore 34 substantially registering with the counterbore 27. A head 35, similar to the head 29, is seated in the outer end of bore 33 to close such bore and to engage the bottom end of the other one of the pair of brake shoes 12. As shown in Fig. 1, a tension spring 36 extends between the shoes 12 and urges them into cooperative relation with the respective heads 29 and 35, as well as aiding in maintaining the shoes in retracted position and in holding the piston 28 in fully retracted position within the body 25.

The flexible conduit 24 is attached to the cylinder 14 through a connector 37, a branch of which is received in a tapped recess 38 in the closure cap 32. A port 39 connects the recess 38 to the counterbore 34. Seated in the closure cap 32 with the cylinder body 25 screwed down thereupon is a diaphragm or partitioning member 41, the periphery of which is sealed by an O-ring 43. A central opening 44 in the member 41 communicates the cylinder bore 26 with the port 39 and recess 38. Flow through the opening 44 is controlled by an O-ring valve 45 seated on a stem 47, the stem 47 extending through the opening 44 with the flanged end thereof lying substantially within the bore 26 on the opposite side of the member 41, with regard to the recess 38.

The opposite end of the stem 47 has a screw threaded connection with a sleeve 48 on which is mounted a cup seal 49 slidable in the bore 33. A piston 51 is mounted in the bore 33 beyond the seal 49 and in abutting relation thereto, a relatively strong spring 52 urging the valve assembly as described rightward or to the position shown in Fig. 2 wherein the O-ring 45 is spaced from the diaphragm member 41 permitting fluid flow through the opening 44 in either direction. Axial motion of the valve assembly leftward a sufficient extent will seat the ring 45 on the diaphragm 41 and so close opening 44. A relatively weak spring 53 is seated on diaphragm 41 and acts on the sleeve 48 in a direction to urge the valve assembly toward closed position.

The extensible piston 28 has secured to its inner end an inwardly facing cup seal 54. In inverse relation to the seal 54 is another cup seal 55 secured to a piston element 56, the element 56 having a flange 57 received in the counterbore 27 and movable between opposite limits as represented by the diaphragm 41 and the bottom of the counterbore 27. A spring 58 interposed between the diaphragm 41 and the piston element 56 urges such element outward or in a right hand direction, as viewed in Fig. 2.

The pistons 28 and 56 are spaced apart but interconnected by a liquid link in the intermediate area 59 between the pistons, it being understood that the spaces within the cylinder and communicating with the inlet recess 38 are filled with hydraulic fluid.

The parts of cylinder 14 normally occupy the positions illustrated. Thus, the stronger spring 52 overpowers spring 53 and holds valve 45 open. Also, the spring 36 overpowers the spring 58, holding the piston 28 in fully retracted position and acting through piston 28 and the liquid link in space 59 to hold piston element 56 fully retracted in seated position on the diaphragm 41. The piston element 56 is hollow or cup-shaped and defines with the diaphragm 41 a pressure chamber 61 into which hydraulic fluid flowing through opening 44 may discharge.

When pressure is applied in the system, a hydraulic fluid under pressure enters recess 38 and flows by way of port 39, counterbore 34 and opening 44 to the pressure chamber 61. Reacting against diaphragm 41, the pressure in chamber 61 urges the piston element 56 outward, which motion, as transmitted through the liquid link in space 59 effects a corresponding extension of the piston 28. This motion, which is in effect a relative separating motion of the piston 28 and body 25, continues until the brake shoes 12 engage the brake drum 11. At this point the pressure in chamber 61 rises and the sum of the pressures acting on stem 47 and on sleeve 48 substantially equals and balances the force exerted by spring 52 whereupon the relatively weaker spring 53 is enabled to move the valve assembly 45 leftward to closed position.

The escape of pressure fluid from the chamber 61 thereby is prevented and the piston 28 and cylinder body 25 are locked in relatively extended position. This condition of the parts will prevail until the pressure applied through recess 38 is discontinued. The pressure acting on sleeve 48 thereby is released and an over-balancing force thereby restored to spring 52 which immediately opens valve 45. The release of pressure in chamber 61 follows and the parts are returned to the position of Fig. 2 by the action of spring 36.

The cylinder 14 is self adjusting for wear of the facing on the brake shoes, in a generally known manner. Thus the piston element 56 has a port 62 therein through which fluid may escape to the back of the cup seal 55 and around the periphery of the cup seal to the space 59 where it is trapped, lengthening the liquid link therein. Thus, if the flange 57 reaches the bottom of the counterbore 27 without the brake shoes having made contact with the brake drum, the hydraulic fluid entering chamber 61 is by-passed around the cup seal 55 and extends the piston 28 by direct lengthening of the liquid link between the piston elements 28 and 56. As additional wear occurs, further compensating adjustments are made in the length of the liquid link in space 59 so that the permitted motion of piston element 56 will tend to be adequate for proper engagement of the brake shoes with the drum.

In apparatus of the kind described, self-adjusting features of the cylinder may suffer from a lack of ability to distinguish between a required compensating adjustment due to wear and one due to a heat induced expansion of the drum 11 relatively to the shoes 12. Extension of the liquid link due to drum expansion may result in binding or dragging of the brake shoes upon subsequent return of the drum to normal dimensions. The cylinder of the instant invention obviates this result by insuring that there will always be a proper clearance between the shoes and drum. In this connection the counterbore 27 is made relatively deep to provide for a longer than usual travel of the piston element 56. Starting with a new brake installation, the element 56 travels its full distance in the counterbore 27 to engage the brake shoes with the drum. In response to the first increment of heat expansion of the drum 11 a corresponding lengthening of the liquid link in space 59 takes place to enable the brake shoes to reach the drum. Cooling of the drum from that first increment reduces the required travel of the shoes for engagement with the drum and accordingly on subsequent operations the piston element 56 does not travel quite to the bottom of the counterbore 27 when moving to engage the shoes with the drum. So long as the dimensions of the drum remain in the range represented by a normal condition and expansion to said first increment no further adjustment in the length of the liquid link is necessary. All heat induced dimensional variations within that range are compensated for in the counterbore 27 which now provides overtravel space for the piston 56 up to the limit represented by the described first increment of expansion.

Should the drum later expand under heat to a value greater than said first increment there is another and corresponding lengthening of the liquid link, and a resultant increase in the overtravel space in the counterbore 27. These adjustments may continue until the maximum heat expanded condition of the drum 11 is reached, the depth of the counterbore 27 beng calculated to provide overtravel space equal to such maximum expanded condition plus an amount providing for a normal and workable clearance between the shoes 12 and the drum 11. The liquid link may also be extended as a result of wear but this does not affect the mode of operation above discussed. There is no recovery or return from adjustments caused by wear as there is from adjustments caused by heat expansion.

That embodiment of the invention shown in Figs. 3 and 4 is an arrangement (commonly known as a "Lockheed" brake) wherein a brake drum 63 is mounted in surrounding relation to a pair of oppositely disposed segmental brake shoes 64. At their lower ends the shoes 64 are pivotally connected to a carrier plate 65, the opposite ends being interconnected by a tension spring 66.

The shoes 64 present arcuate flanges 67 overlaid with a facing material for contact with the drum 63. Influenced by the spring 66 the shoes normally occupy a retracted position as shown. A braking operation is effected by spreading apart the shoes to press the facing material into frictional engagement with the internal surface of the drum.

Motion of the brake shoes relative to the drum is effected by or under the control of hydraulic actuating means including a wheel cylinder 69. Oppositely disposed pistons 71 and 72 in the cylinder 69 engage opposing shoes 64 at their upper ends. Arms 73 and 74 pivotally mounted on the shoes 64, engage sleeve pistons 83 and are interconnected by a tension spring 75 which tends to retract the brake shoes and the elements of the cylinder 69.

Approximately mid-way along its length the cylinder 69 has a radial port or opening 76 receiving one end of a fluid conduit. This conduit leads from a source of hydraulic fluid selectively placed under pressure, for example, by operation of the master cylinder of conventional hydraulic braking systems.

As shown in Fig. 4, the pistons 71 and 72 are parts of separate assemblies which are individually like the assembly of Fig. 2 except that means for increasing the applied pressure is provided since the principal function of the cylinder 69 is one of braking rather than adjusting. Referring by way of example to the assembly associated with piston 72, such assembly further includes cup seals 78 and 79 and piston element 81, valve assembly 82 and associated springs all arranged and operating like the corresponding elements of the first considered embodiment. In this instance, however, the piston elements 72 and 81 are mounted in an outer sleeve piston 83 in turn reciprocably mounted in the cylinder 69. The inner end of the piston 83 provides a counterbore 84 corresponding to the counterbore 27 and is closed by a threaded diaphragm or cap 85 presenting an opening 86 corresponding to the opening 44, controlled by valve assembly 82. Pressure fluid entering the cylinder by way of opening 76 passes through opening 86 and acts on piston element 81, moving this element and the piston 72 and the intermediate liquid link outward until the brake shoes engage the brake drum. When this occurs, and displacement of the piston element 81 accordingly is halted, the pressure within the cylinder 69 begins to rise and is applied through the diaphragm 85 over the entire end surface of the outer sleeve piston 83. The piston 83 carries with it during movement the inner piston 72 so that the heavier pressure applied by the outer piston is transmitted through the piston 72 to the brake shoes 64. The outer piston 83 and diaphragm 85 move relative to the valve assembly 82 to close the opening 86 and thereby lock the inner piston assembly in outwardly adjusted position.

In the embodiment of Figs. 3 and 4 the valve assemblies 82 of respective oppositely disposed piston units have been made to abut one another whereby they may mutually cooperate with one another to hold the other in open position.

Upon release of pressure within cylinder 69, arms 73—74 immediately retract the sleeve pistons 83 under influence of spring 75. The valve assemblies 82 are brought into abutting relation and opened to release the trapped pressure within piston element 81. Pistons 71 and 72 are thereupon retracted again under influence of spring 75 acting through the lower ends of levers 73—74. The brake is thereupon in released condition ready for a subsequent application.

In both the forms of Fig. 2 and Fig. 4 means are provided for bleeding the liquid link of entrapped air. In Fig. 2 a suitable valved passage 87 is provided while in Fig. 4 a suitably valved passage 88 is provided in the sleeve piston 83, the valve control over such passages being shown diagrammatically in the drawings.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. In a hydraulically operated brake mechanism, a cylinder, an opening in the cylinder wall defining the entrance and exit for the hydraulic fluid, an outer sleeve piston in said cylinder and extensible through one end thereof, resilient means to retract said outer sleeve piston in the cylinder, a diaphragm extending across the inner end of said sleeve piston, an inner piston means slidably mounted in the outer piston, said inner piston means being extensible relatively to the outer piston, an opening in said diaphragm for the admission of hydraulic fluid to said piston means for the extension thereof, the application of pressure in the cylinder serving first to extend said inner piston means until said means encounters resistance and then to extend said outer sleeve piston, a valve for closing said diaphragm opening, and a reactant member in said cylinder holding said valve open until closed by motion of said outer sleeve piston relatively thereto.

2. A hydraulically operated brake mechanism according to claim 1, characterized by a second inversely arranged piston assembly in said cylinder, the valves of respective assemblies extending into cooperative relation to serve mutually as reactant members for one another.

3. A hydraulically operated brake mechanism including a wheel cylinder, an opening therein defining an entrance and exit for pressure fluid, outer sleeve pistons in said cylinder extensible through the ends thereof, diaphragms extending across the inner ends of said sleeve pistons, inner piston means slidably mounted in each of the outer pistons, said inner piston means being extensible relative to the outer pistons and carrying upon the outer ends thereof for movement relative to a surrounding brake drum a brake shoe, a valved opening in each of said diaphragms through which pressure fluid is admitted to the inner piston means for the extension thereof, means for closing said valved opening by movement of the outer piston, the construction and arrangement being such that application of fluid pressure within said cylinder first extends the inner piston means until it encounters resistance and then extends the outer piston and with it the inner piston means and associated brake shoe, spring biased means engageable with the outer ends of the outer pistons and with the brake shoes, the construction and arrangement being such that upon release of pressure within the cylinder the spring biased means first returns the outer pistons to their normal position and subsequently the inner piston means to their normal positions, said valved openings being opened upon return of the outer pistons to normal position to thereby permit return of the inner pistons to normal position under influence of the spring bias means.

References Cited in the file of this patent

UNITED STATES PATENTS

| | | |
|---|---|---|
| 2,141,541 | Levy | Dec. 27, 1938 |
| 2,158,700 | Hoyt | May 16, 1939 |
| 2,189,134 | Chard | Feb. 6, 1940 |
| 2,227,245 | Carroll | Dec. 31, 1940 |
| 2,240,792 | Liebreich | May 6, 1941 |
| 2,255,974 | Hoyt | Sept. 16, 1941 |
| 2,282,556 | Bowen | May 12, 1942 |
| 2,638,186 | Oswalt | May 12, 1953 |